United States Patent [19]

Hogan

[11] Patent Number: 4,559,869

[45] Date of Patent: Dec. 24, 1985

[54] ADJUSTABLE BARBECUE RACK

[76] Inventor: Leroy Hogan, 412 Fairgreen, Youngstown, Ohio 44504

[21] Appl. No.: 626,295

[22] Filed: Jun. 29, 1984

[51] Int. Cl.$^4$ .............................................. A47J 43/18
[52] U.S. Cl. ...................................... 99/426; 99/448; 99/449; 99/450; 211/184
[58] Field of Search ................ 99/426, 449, 448, 450, 99/416, 417; D7/403, 409; 211/181, 184

[56] References Cited

U.S. PATENT DOCUMENTS

| | | | |
|---|---|---|---|
| 2,616,360 | 11/1952 | Thompson | 99/426 X |
| 3,405,631 | 10/1968 | Thomas | 99/426 |
| 3,585,922 | 6/1971 | Peterson | 99/450 X |
| 3,613,353 | 10/1971 | Popeil | 99/426 |
| 3,915,309 | 10/1975 | Brazdo | 99/448 X |
| 3,994,213 | 11/1976 | Brezinski | 99/449 X |
| 4,074,102 | 2/1978 | Asen | 99/426 X |
| 4,410,093 | 10/1983 | Chiariello | 211/184 X |

*Primary Examiner*—Billy J. Wilhite
*Attorney, Agent, or Firm*—Harpman & Harpman

[57] ABSTRACT

An adjustable barbecue rack for supporting a plurality of spareribs vertically having a series of spaced upright racks extending from a main support rack. The main support rack is positioned in elevated relation within a shallow pan during cooking. The upright racks are removably secured to the main support rack so that they can be adjusted to accommodate a variety of food product sizes places within.

3 Claims, 5 Drawing Figures

ADJUSTABLE BARBECUE RACK

BACKGROUND OF THE INVENTION

1. Technical Field

This invention relates to cooking and roasting racks of the type used to support food products in elevated manner during cooking to prevent food from sticking and burning to the roasting pan which is used to retain the juices that accumulate during the cooking of the food products.

2. Description of the Prior Art

Prior art devices of this type have relied on a variety of different designs to support and separate food while cooking. See for example U.S. Pat. Nos. 4,074,102, 3,585,922, 3,405,631 and 3,994,213.

In U.S. Pat. No. 4,074,102, an oven rack is disclosed having a base rack within a pan with a number of upright arms selectively positioned thereon.

U.S. Pat. No. 3,585,922 discloses a roaster basket having a bottom grill with movable side members that can be extended outwardly beyond the bottom grill to accommodate large roasts or the like.

In U.S. Pat. No. 3,405,631, a roasting and slicing rack can be seen having a plurality of guide rods vertically secured to one another in spaced relation. The guide rods are adjustable horizontally on a support frame.

U.S. Pat. No. 3,994,213 discloses a sandwich preparation and warming pan wherein a plurality of corrugation are formed within a wire frame to support individual sandwiches in a spaced manner.

Applicant's adjustable barbecue rack has a plurality of spaced upstanding racks secured to a main support rack for holding a number of spareribs in upright position within a shallow pan to provide even exposure and cooking rate for the ribs. Some of the spaced upstanding racks are removably secured to the main support rack to accommodate various sizes of food products.

SUMMARY OF THE INVENTION

An adjustable barbecue rack for spareribs wherein the ribs are supported in spaced vertical aligned relation between a plurality of upright wire racks which are in turn secured to a main support rack positioned in elevated relation within a shallow oven pan. A selected number of the upright wire racks are removably positioned on the main support rack so that the adjustable barbecue rack can accommodate various sizes of food products as required.

DESCRIPTION OF THE PREFERRED EMBODIMENT

An adjustable barbecue rack for use in cooking spareribs or the like comprising a main support base 10 having a number of aligned evenly spaced base wire support rods 11, 12 and 13 of an equal length to which are secured a plurality of transversely positioned closely spaced cross support wire rods 14 defining a generally rectangular rack configuration.

Each of the cross support wire rods 14 are secured at right angles to the base wire support rods 11, 12 and 13 at their intersecting points by welding forming a strong integral structure as is well known in the art. The base wire supports rods 11, 12 and 13 are of a larger diameter than said cross support wire rods 14 to insure adequate support for the spareribs which will be resting thereon.

Figure 1:
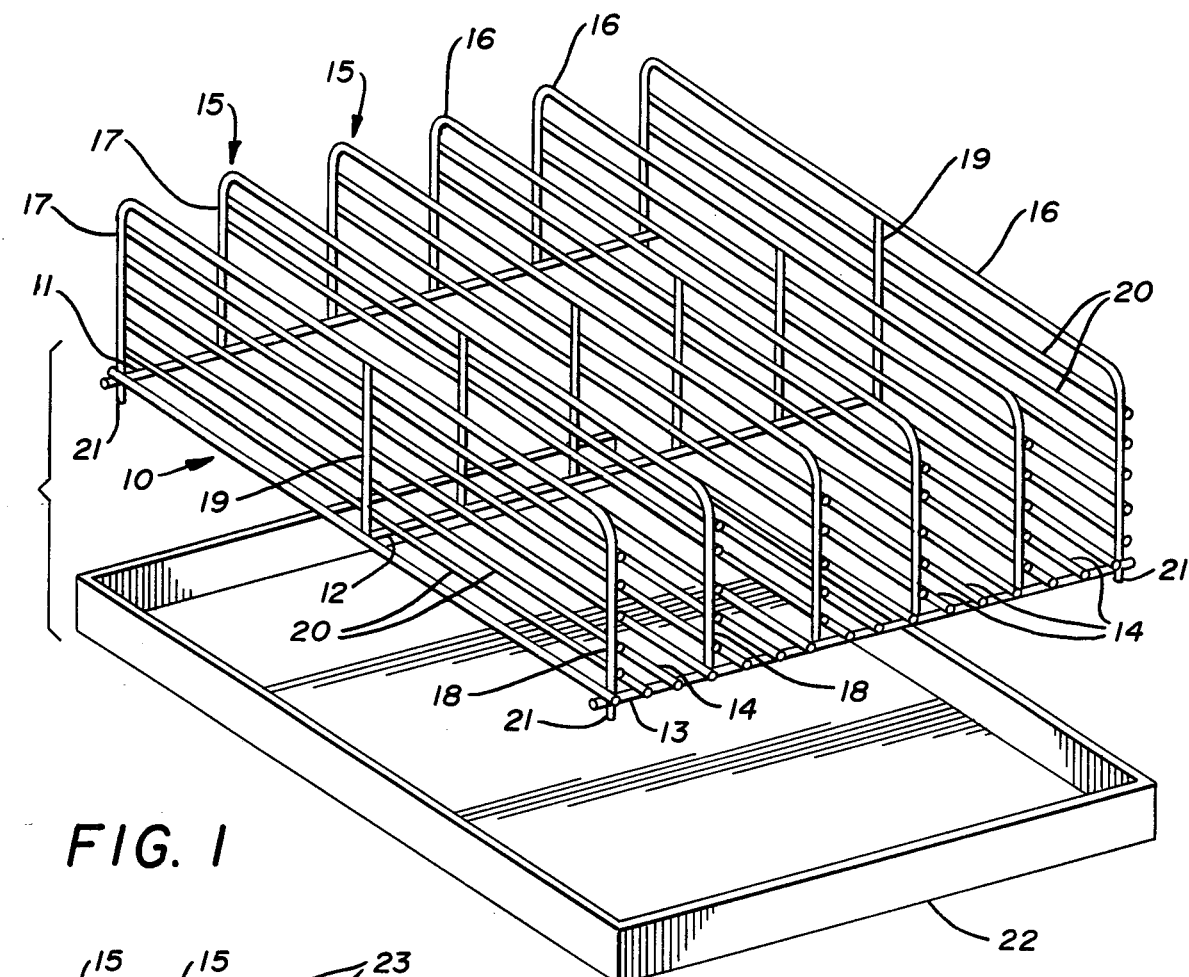
FIG. 1 is a perspective view of the barbecue rack.
Figure 2:
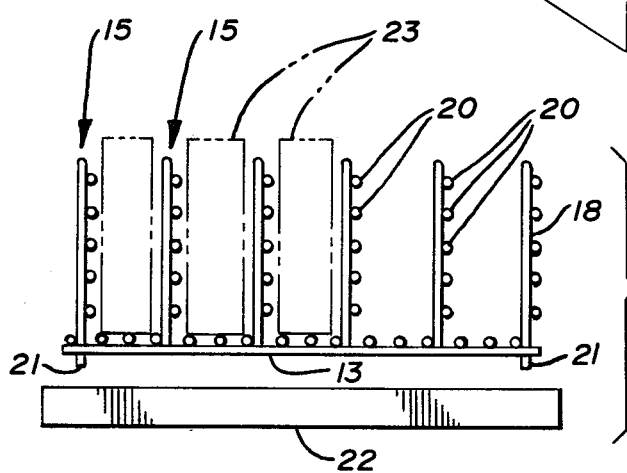
FIG. 2 is an end plan view of the barbecue rack on lines 2—2 of FIG. 1.
Figure 3:
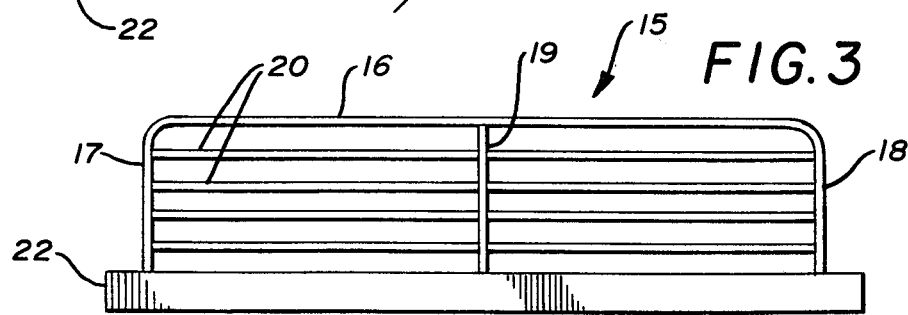
FIG. 3 is a side plan view of the barbecue rack.

Referring now to FIGS. 1,2 and 3 of the drawings, a plurality of spaced, aligned upstanding partitions 15 can be seen, each of which has a main support frame 16 with oppositely disposed downturned parallel end members 17 and 18 and a center support rod 19 extending from said main support frame 16.

The lower end portions of the end members 17 and 18 and the center support rod 19 are secured to the base wire support rods 11, 12 and 13 respectively. A plurality of secondary cross support rods 20 are secured by welding in spaced relation to one another over the main support frame 16 as best seen in FIGS. 2 and 3 of the drawings.

Two of the partitions 15 adjacent the ends of said base wire support rods 11, 12 and 13 have a portion of the end members 17 and 18 extending downwardly beyond the wire support rods 11 and 13 defining pairs of feet 21 that effectively elevate the main support base 10 which is positioned in a shallow baking pan 22 as will be well understood by those skilled in the art and as best seen in FIG. 3 of the drawings.

Spareribs 23, shown in broken lines, are positioned between the partitions 15 in an upright manner with the partitions 15 separating and spacing the spareribs 23.

Figure 5:
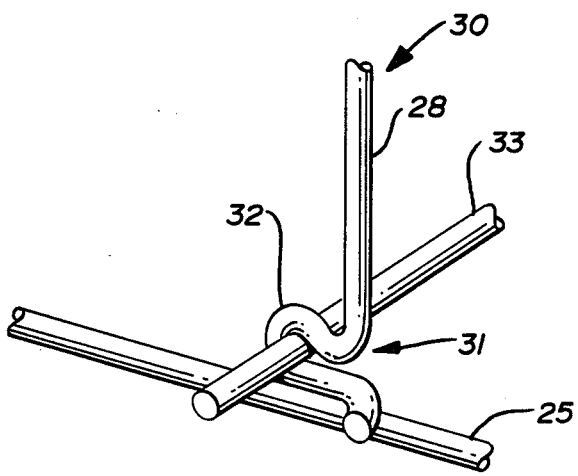
FIG. 5 is an enlarged view of a portion of an alternate form of the barbecue rack.
Figure 4:
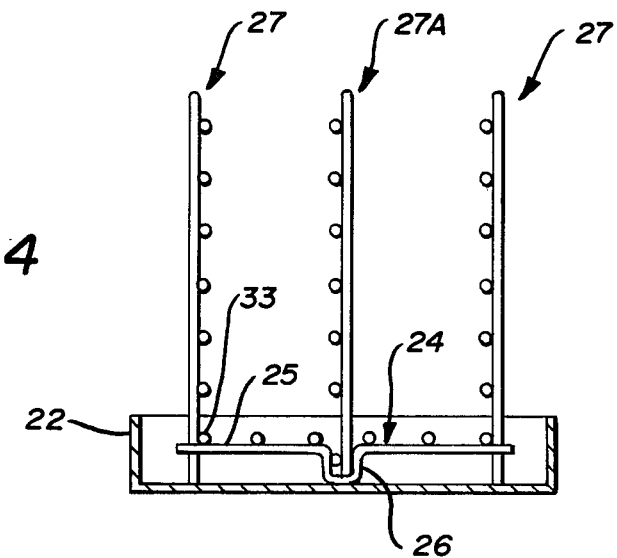
FIG. 4 is a cross sectional view of an alternate form of the barbecue rack.

Referring now to FIGS. 4 and 5 of the drawings, alternate forms of the invention can be seen wherein a secondary support base 24 has a modified secondary base wire support rod 25 having a center portion 26 defining a U-shaped bend therein so that a secondary upstanding partition 27A can be removably positioned within thereby adjustably changing the overall spacing of said partitions 27 allowing wider food products to be positioned within as seen in FIG. 4 of the drawings.

In FIG. 5 of the drawings, an alternate attachment method is disclosed for the secondary upstanding partitions 27A wherein secondary end members 28 and 29 of a secondary main support frame 30 are modified at 31 having a right angularly curved configuration at 32 engageable around the secondary cross support rods 33 effectively locking the same in vertical position in relation thereto.

It will be apparent from the foregoing description that spareribs placed vertically within the adjustable barbecue rack of the invention will cook evenly since all of the rib surfaces are exposed to the heat evenly and the thermal currents produced within the oven will circulate effectively around the ribs in a highly desirable manner unlike that of present roasting pans. The ribs within the adjustable barbecue rack of the invention are cooked slowly over low heat assuring properly cooked spareribs.

It will thus be seen that a new and useful adjustable barbecue rack has been illustrated and described and it will be obvious to those skilled in the art that various changes and modifications may be made therein without departing from the spirit of the invention and having thus described my invention, what I claim is:

1. An adjustable barbecue rack for cooking spareribs comprising a main support base having elongated evenly spaced base wire support rods, at least one of which has a U-shaped bend therein, a plurality of cross support wires secured to said rods, a plurality of spaced aligned upstanding partitions carried by said main support base, at least one of said upstanding partitions removably positioned on said main support base, said partitions having a main support frame, a plurality of transversely extending secondary cross support rods secured thereto, means for supporting said main support base and said upstanding partitions carried thereby in elevated positions.

2. The adjustable barbecue rack of claim 1 wherein said means for supporting said main support base and said upstanding partitions comprises oppositely disposed downturned parallel end members of said main support frame.

3. The adjustable barbecue rack of claim 1 wherein said main support frame is positioned within a pan.

* * * * *